Oct. 13, 1970  J. K. PASSENO, JR  3,533,206
BUILDING BLOCK HOLDER FOR FABRICATING VENEER WALLS
Filed July 16, 1968

INVENTOR
JAMES K. PASSENO, JR.
BY
Donnelly, Mentag & Harrington
ATTORNEYS

Oct. 13, 1970  J. K. PASSENO, JR  3,533,206
BUILDING BLOCK HOLDER FOR FABRICATING VENEER WALLS
Filed July 16, 1968
3 Sheets-Sheet 2
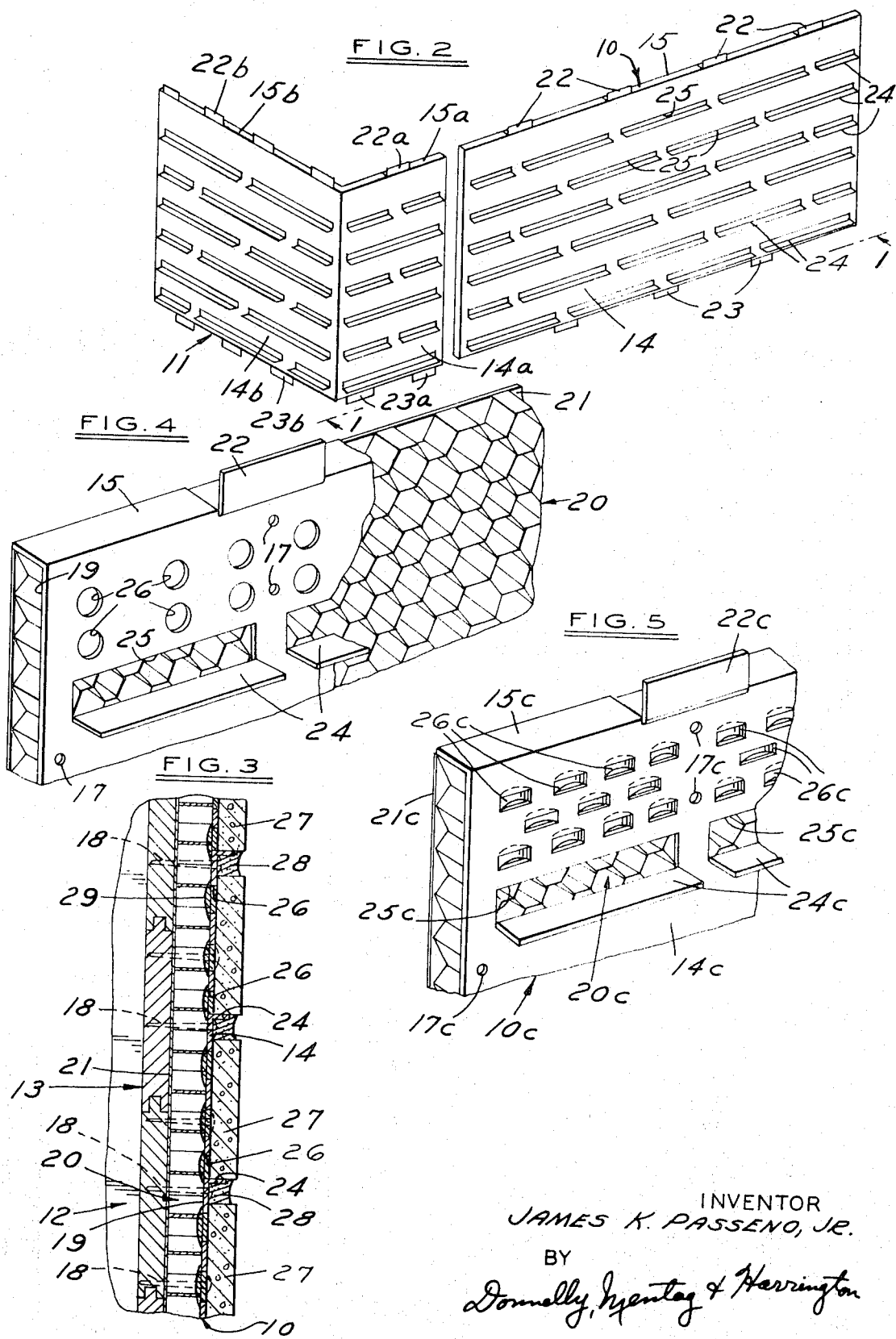

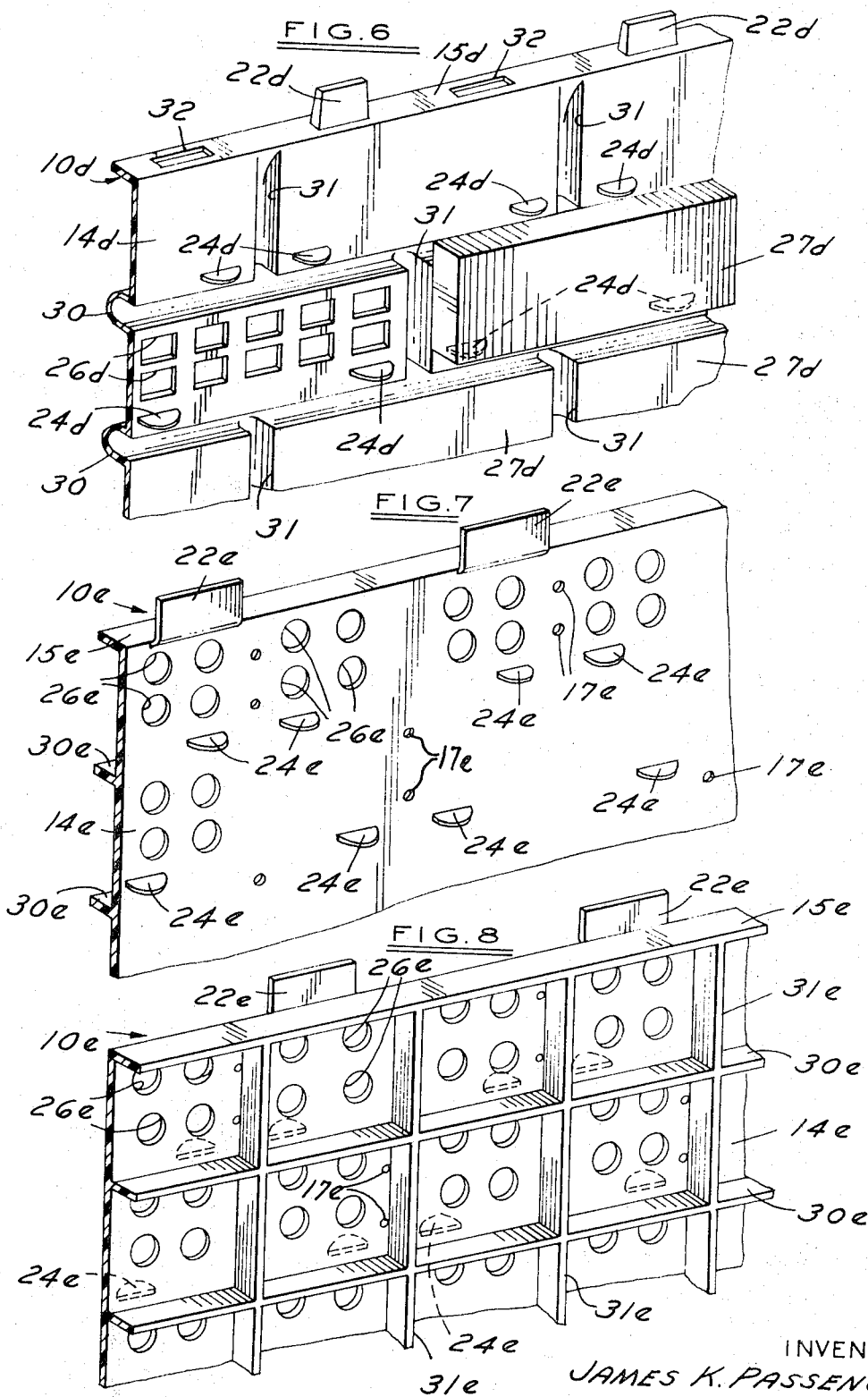

United States Patent Office 3,533,206
Patented Oct. 13, 1970

3,533,206
BUILDING BLOCK HOLDER FOR FABRICATING VENEER WALLS
James K. Passeno, Jr., 27626 Hampden,
Madison Heights, Mich. 48071
Filed July 16, 1968, Ser. No. 745,318
Int. Cl. E04f *13/08;* E04c *5/18*
U.S. Cl. 52—387                                    7 Claims

ABSTRACT OF THE DISCLOSURE

A building block holder for fabricating a veneer facing wall from half-inch thick, regular size bricks, pre-cast stone blocks, ceramic tiles or the like, and which includes a flat panel made from a rigid material as metal, plastic or the like. The panel is provided with holes for nailing the panel to the outer face of a building wall, and with a locking means for positioning and locking the panel in place relative to a similar panel. The panel is also provided with integral tabs for supporting the building blocks and a plurality of holes formed therethrough for the reception of the overflow of an adhesive mounted on the outer face of the panel for retaining the building blocks on the panel. The panel is provided with inwardly extended flanges to space the panel from a building wall to provide an insulating dead air space which may be filled with an insulating material, as for example, a solid type insulation material, or a honeycombed material having a layer of moisture proof material on the inside surface thereof.

SUMMARY OF THE INVENTION

This invention relates generally to the art of forming relatively thin face veneer walls on the exterior or interior of a building wall, and more particularly, to a novel and improved building block holder for use in fabricating such veneer facing walls.

Heretofore, attempts have been made to provide various types of building block holders or retaining means, but such prior art building block holders have not been successful for various reasons, and they incorporated many disadvantages. One disadvantage of the prior art building block holders was that they were costly to make and costly to install. Another disadvantage of such prior art building block holders was that they were heavy and they did not retain the building blocks in place efficiently since the building blocks worked loose over periods of time. A further disadvantage was that the prior art building block holders did not provide insulation, and accordingly, separate insulation means was required if it was desired to provide the building with both insulation and a veneer facing wall.

In view of the foregoing it is an important object of the present invention to provide a building block holder for fabricating a veneer facing wall which is adapted to overcome the aforementioned disadvantages of the prior art building block holders or retaining means.

It is another object of the present invention to provide a novel and improved building block holder for fabricating a veneer facing wall which is simple and compact in construction, economical to manufacture, and light in weight.

It is another object of the present invention to provide a building block holder for fabricating a veneer facing wall and which includes a rigid panel provided with means for securing the panel to a building wall, locking means for locking the panel to adjacent panels, tabs for supporting a plurality of building blocks on the outer face of the panel, means for spacing the panel from the building wall, and a plurality of apertures for receiving the overflow of a suitable adhesive mounted between the building blocks and the panel for holding the building blocks on the outer face of the panel.

It is a further object of the present invention to provide a novel and improved building block holder for fabricating a veneer facing wall which is also provided with means for forming a dead air space between the facing wall and a building, and which dead air space can be filled with a suitable insulating material, if desired, such as a solid insulating material, a foam plastic type of insulating material, a honeycomb type of insulating material, or the like.

Other objects, features and advantages of this invention will be apparent from the following detailed description, appended claims, and the accompanying drawings:

In the drawings:

FIG. 2 is a perspective view of a flat wall panel and a corner wall panel made in accordance with the principles of the present invention;

FIG. 3 is an enlarged, fragmentary, elevational section view of the structure illustrated in FIG. 1, taken along the line 3—3 thereof, looking in the direction of the arrows, and showing the panel attached to a building wall;

FIG. 4 is a fragmentary, perspective, front elevational view of the upper left hand corner of the flat wall panel of FIG. 2, and showing parts removed;

FIG. 5 is a fragmentary, perspective view, similar to FIG. 4, but showing a modified flat wall panel made in accordance with the principles of the invention;

FIG. 6 is a fragmentary, perspective view, similar to FIG. 4, and showing a second modified flat wall panel made in accordance with the principles of the present invention;

FIG. 7 is a fragmentary, perspective view, similar to FIG. 4, and showing a third modified flat wall panel made in accordance with the principles of the present invention; and, FIG. 8 is a rear perspective view of the panel structure of FIG. 7.

Figure 1:
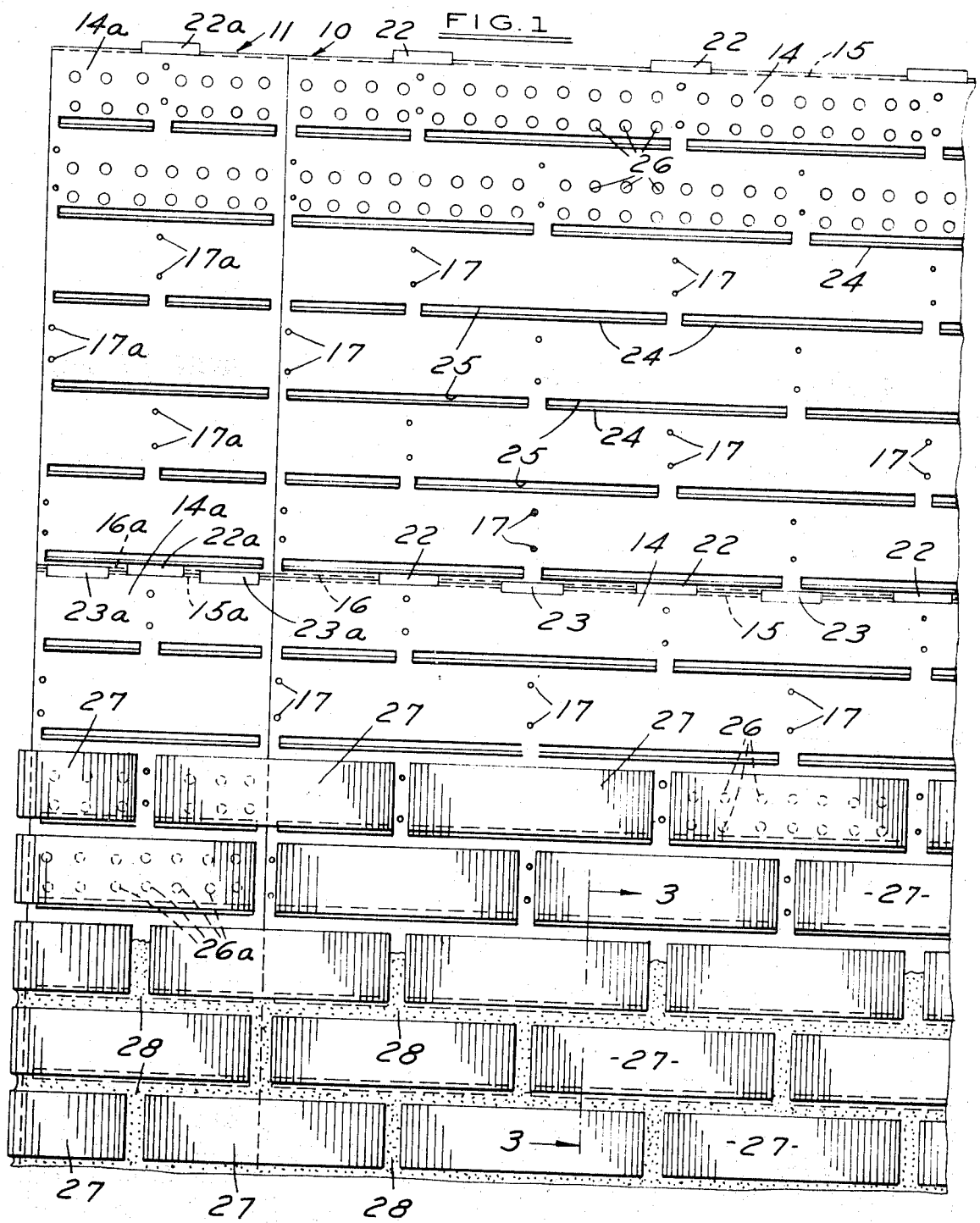
FIG. 1 is an enlarged, fragmentary, elevational view of a flat wall panel and a corner wall panel for holding bricks, taken along a line, as 1—1 of FIG. 1, looking in the direction of the arrows, and showing the panels abutting each other and having a number of bricks mounted thereon.

Referring now to the drawings, and in particular to FIGS. 1 and 2, the numerals 10 and 11 generally indicate a flat wall building block holder panel and a corner wall building block holder panel, respectively, made in accordance with the principles of the present invention. A plurality of panels 10 and 11 would be used for forming a veneer facing wall on the outer face of a building wall. For example, in FIG. 3, a fragmentary portion of a building wall is shown as having attached thereto a fragmentary portion of the panel 10. The numeral 12 in FIG. 3 generally indicates a building stud and the numeral 13 generally indicates a building wall siding.

As shown in FIG. 1, the panel 10 includes a rigid sheet of material 14 which is provided on the upper and lower ends thereof with the inwardly extended, integral flanges 15 and 16, respectively. The flanges 15 and 16 are adapted to abut the outer face of a building wall, as the siding 13 to form a dead air space as indicated by the numeral 19 in FIG. 3. As shown in FIG. 1, the panel 10 is provided with a plurality of holes 17, through which are mounted fastening means, as the nails 18, for securing the panel 10 to a building wall, as illustrated in FIG. 3. It will be understood that the dead air space 19 may be left vacant or filled with a suitable insulating material, as for example, a solid type of insulating material, a plastic foam type of insulating material, or a honeycomb type of insulating material as generally indicated by the numeral 20 in FIG.

3. The numeral 21 in FIG. 3 designates a layer of material on the inner side of the insulating material 20 which would preferably be a material to form a moisture proof and reflecting seal, as for example, a metal type material.

As shown in FIGS. 1 and 4, the panel 10 is provided with a plurality of spaced apart locking tongues 22 which are struck from the upper flange 15 and offset outwardly. As shown in FIG. 1, the bottom flange 16 is also provided with a plurality of spaced apart locking tongues 23 which are offset outwardly. As shown in FIG. 1, the locking tongues 22 on one panel 10 are adapted to overlap the lower edge of the next-above disposed panel 10. The locking tongues 23 on one panel 10 are adapted to overlap the upper edge of the next-below disposed panel 10. The locking tongues 22 and 23 lie in the mortar areas between the building blocks held on the panels 10.

As best seen in FIG. 4, the panels 10 are provided with a plurality of building block supporting tabs 24 which are equal in length to the length of the brick or other building block which is to be used. The tabs 24 are vertically spaced apart about four inches for bricks and they are offset lengthwise from each other as shown in FIG. 1. Every other row of tabs 24 are substantially half size in length along the panel edge for coaction with similar half size tabs on adjacent panels. The tabs 24 are spaced endwise from each other a distance equal to the width of the mortar to be placed between the bricks or other building blocks. The numeral 25 indicates the opening which is formed in the sheet of material 14 when a tab 24 is struck therefrom. The holes 26 are adhesive holes to permit adhesive to flow through the panel 10 along the inner side of the sheet of material 14 to form a clamping or gripping action on the panel. The panel 10 with its flanges 15 and 16, tongues 22 and 23, tabs 24, and holes 17 and 26 may be formed by any suitable operation, as for example, a stamping operation.

In use, the outer face of the sheet of material 14 would be covered with a suitable adhesive as indicated by the numeral 29 in FIG. 3. The numerals 27 indicate brick type building blocks and they are mounted on the tabs 24 and pressed against the adhesive 29. The adhesive 29 is preferably a suction type adhesive and the bricks 27 are thus securely held in place on the panel 10. The excessive adhesive flows inwardly through the adhesive apertures or holes 26 and over the inner surface of the sheet of material 14 for gripping engagement therewith. The adhesive holes 26 are shown as being circular in the embodiment of FIGS. 1 through 4. The space between the bricks 27 is filled with conventional mortar as indicated by the numeral 28. It will be understood that the lightweight panels 10 may be shipped to the site of a building and quickly nailed in place and the bricks 27 applied thereto as described hereinabove.

The corner panel 11 is constructed in the same manner as the panel 10, but it is bent to form the two right angle portions 14a and 14b. The parts of the panel 11 which are the same as the parts of the panel 10 are marked with the same reference numerals followed by the small letters $a$ and $b$. The portion 14b of the panel 11 is substantially twice as long as the panel portion 14a. When the building blocks used are brick, the panel 10 is preferably 34 inches long and 16¼ inches in height.

FIG. 5 illustrates a second embodiment of the invention and the parts thereof which are the same as the parts of the panels 10 are marked with the same reference numerals followed by the small letter $c$. The only difference between the panel 10c and the panel 10 is that the adhesive holes 26c are formed by extruding small portions of the panel 14c inwardly.

FIG. 6 illustrates a third embodiment of the invention and the parts thereof which are the same as the parts of the panel 10 are marked with the same reference numerals followed by the small letter $d$. The panel 10d is shown as being molded from a suitable plastic, as an epoxy plastic, and provided with a plurality of additional, inwardly extended, U-shaped horizontal flanges 30, and a plurality of intersecting, vertical, U-shaped, inwardly extended flanges 31. The flanges 30 are vertically spaced apart from each other, and the vertical flanges 31 are horizontally spaced apart from each other. The vertical flanges 31 in one row are offset from the vertical flanges 31 in the adjacent rows. The second difference in the panel 10d over the panel 10 is that the adhesive holes 26d are formed as square holes. Still another difference in the panel 10d is that the building block supporting tabs 24d are half round in plan shape, and two of these tabs are used to support each building block 27d. Another difference in the embodiment of FIG. 6 is that the panel 10d is provided on the upper end thereof with locking tongues 22d and locking tongue holes 32 for inlocking engagement with similar tongues and holes on the lower end of a similar panel 10d.

FIGS. 7 and 8 show a fourth embodiment of the invention and the parts thereof which are similar to the parts of the panel 10 are marked with the same referenec numerals followed by the small letter $e$. The panel 10e is shown as being molded from a suitable plastic material or the like, as an epoxy plastic, and it is provided with horizontal and vertical, inwardly extended, flanges 30e and 31e, respectively, in a manner similar to the flanges 30 and 31 of the embodiment of FIG. 6. The building block supporting tabs 24e are also similar to the tabs 24d of the embodiment of FIG. 6.

The embodiments of FIGS. 6 and 7 are shown as not including the insulating material 20, but it will be understood that they may be provided with an insulating material in the same manner as indicated in the first embodiment of FIGS. 1 through 4. The embodiments of FIGS. 5, 6 and 7 function in the same manner as the first described embodiment of FIGS. 1 through 4. The locking tongues 22 and 23 are made to a size so as to lie in a horizontal layer of mortar 28 between two rows of building blocks. For example, if the mortar layer is ¼ inch in weight, the locking tongues 22 and 23 would extend about ³⁄₁₆ of an inch over the adjacent panel.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:
1. A building block holder for fabricating a veneer facing wall on a building wall comprising the combination of:
   (a) a flat, rectangularly shaped panel formed from a sheet of rigid material;
   (b) said panel being provided with an inwardly extended flange along the upper end thereof and an inwardly extended flange along the lower end thereof to space the panel from a building wall;
   (c) means for securing the panel in place on a building wall;
   (d) said panel being provided with a plurality of outwardly extended building block supporting tabs in vertically spaced apart rows, and in horizontally spaced positions, and in vertically offset positions;
   (e) said panel being provided with a plurality of apertures formed therethrough in positions between the building block supporting tabs to receive the overflow of an adhesive for securing building blocks to the panel;
   (f) locking means on the upper and lower ends of the panel to lock the panel to similar panels positioned at the upper and lower ends thereof; and
   (g) said locking means comprising a plurality of locking tongues parallel to the flat panel and mating locking tongue apertures disposed at a right angle to the flat panel.

2. A building block holder for fabricating a veneer facing wall on a building wall comprising the combination of:
- (a) a flat, rectangularly shaped panel formed from a sheet of rigid material;
- (b) said panel being provided with an inwardly extended flange along the upper end thereof and an inwardly extended flange along the lower end thereof to space the panel from a building wall;
- (c) means for securing the panel in place on a building wall;
- (d) said panel being provided with a plurality of outwardly extended building block supporting tabs in vertically spaced apart rows, and in horizontally spaced positions, and in vertically offset positions;
- (e) said panel being provided with a plurality of apertures formed therethrough in positions between the building block supporting tabs to receive the overflow of an adhesive for securing building blocks to the panel;
- (f) locking means on the upper and lower ends of the panel to lock the panel to similar panels positioned at the upper and lower ends thereof; and,
- (g) said locking means comprising a plurality of locking tongues that overlap adjacent panels in a facing wall.

3. A building block holder for fabricating a veneer facing wall on a building wall as defined in claim 2, wherein:
- (a) said panel is formed by stamping it from a sheet of metal.

4. A building block holder for fabricating a veneer facing wall on a building wall as defined in claim 2, wherein:
- (a) said panel is formed by a molding operation.

5. A building block holder for fabricating a veneer facing wall on a building wall as defined in claim 2, wherein:
- (a) an insulating material is mounted on the inner side of the panel.

6. A building block holder for fabricating a veneer facing wall on a building wall as defined in claim 2, wherein:
- (a) said panel is provided with a plurality of horizontal, inwardly extended flanges on the inner side thereof which are vertically spaced from each other and the aforementioned flanges on the upper and lower ends of the panel.

7. A building block holder for fabricating a veneer facing wall on a building wall as defined in claim 2, wherein:
- (a) said panel is provided with a plurality of vertical, inwardly extended flanges on the inner side thereof which are horizontally spaced from each other and the aforementioned flanges on the upper and lower ends of the panel.

References Cited

UNITED STATES PATENTS

| | | | |
|---|---|---|---|
| 830,313 | 9/1906 | Fenn | 52—386 |
| 845,550 | 2/1907 | Hunter | 52—392 |
| 1,936,507 | 11/1933 | Green | 52—386 |
| 1,946,690 | 2/1934 | Haines | 52—386 |
| 2,223,721 | 12/1940 | Ernstoff | 52—391 |
| 2,202,568 | 5/1940 | Worden | 52—387 |
| 2,852,932 | 9/1958 | Cable | 52—387 |
| 3,142,938 | 8/1964 | Eberhardt | 52—391 |

HENRY C. SUTHERLAND, Primary Examiner

U.S. Cl. X.R.

52—391